April 18, 1961 R. RAFFAETÁ 2,980,717
CONTINUOUS PURIFICATION AND DECOLORIZING OF OILS
Filed Feb. 6, 1957
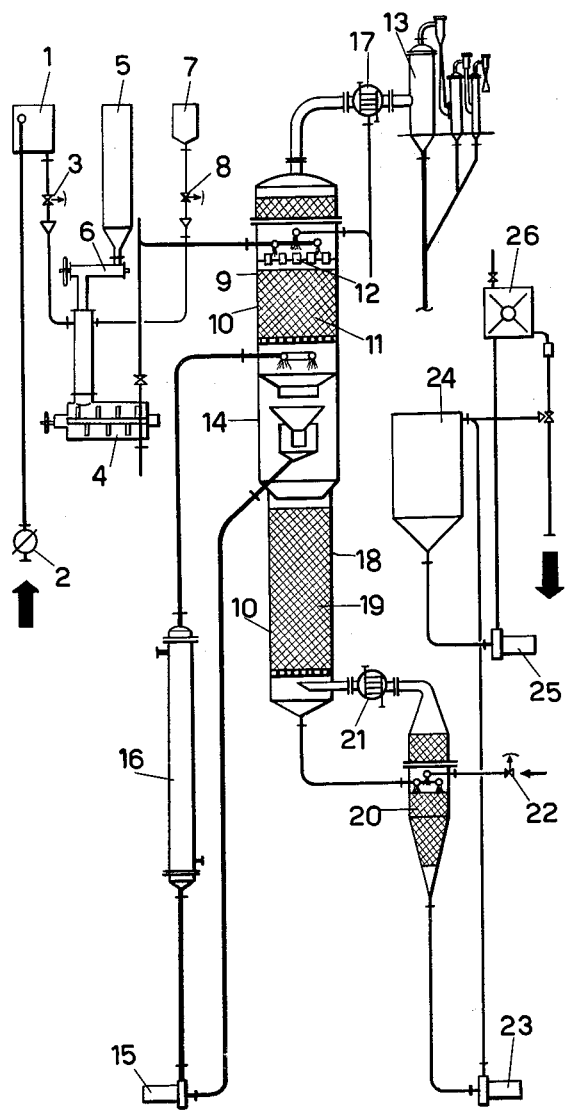
INVENTOR:
RENATO RAFFAETÁ
BY
Richardson, David and Nordon
ATTYS.

2,980,717

CONTINUOUS PURIFICATION AND DECOLORIZING OF OILS

Renato Raffaetá, Via Marco Polo 5, Milan, Italy

Filed Feb. 6, 1957, Ser. No. 638,609

Claims priority, application Italy Feb. 16, 1956

5 Claims. (Cl. 260—428)

The present invention relates to extraction and purification of oils. More particularly, the invention concerns a method for the removal of resins and coloring matters from mineral oils and animal and vegetable oils and fats.

The process and apparatus according to the present invention apply particular physical and chemical means determining according to a prearranged order definite actions upon liquid mixtures in order to operate or facilitate the extraction or separation of certain components.

The subject process is interesting for the whole field of extraction and recovery of valuable products such as for instance vitamins present in organic liquids or juices and of separation and elimination from mineral oils, from fats and from other natural or industrial products, of certain components of a character different from the original one or from that of the main component.

In similar treatments recourse is often had to auxiliary materials having selective action upon certain components of a mixture, such as for instance decolorizing earths or activated carbons in decolorizing minerals oils, fats and organic juices, which thanks to the application of the instant process acquire new capabilities as well as increases of their specific original adsorbent power.

The process according to the present invention is based essentially on the fact of subjecting the mixture to be treated to at least two successive actions: the first one of thermal or radiating character with a suddent effect obtainable by any means, the second one of physical or chemical character exerted by a reacting or activating means in the shape of vapour upon the mixture under treatment, distributed over a prearranged wide surface.

These actions bring about upon certain components of the mixture such transformations or phenomena as to promote or facilitate their subsequent separation or extraction. The same actions also involve regulating or activating phenomena upon the reagents and adsorbents that may have been previously added to the mixture.

The apparatus equipment for carrying out the process may have various shapes and arrangements according to the purposes for which the process according to the present invention is employed.

The characteristic specific actions of the process may be effected in two distinct sets of apparatus. By this procedure the mixture is fed or injected under pressure or sucked under vacuum by means of pumps, injectors or other into the first apparatus where it undergoes the specific sudden thermal or radiating action of the means prearranged for this purpose, then it is taken off or extracted by pumps, extractors or any other means for passage into the second apparatus where, being distributed over a prearranged wide surface it is subjected to the specific action of the reagent or activating means provided in the shape of vapour.

The same characteristic srecific ac·ions of th· process may take place, as is the simplest case, in two se.ti ns of one single apparatus.

The apparatus equipment for carrying out the process may even be constituted essentially by a so-called activating column divided into three sections within the first of which a preparatory action of the instant process is accomplished which then is carried out as the process proper in the other two sections of the same column.

In the first section the mixture to be treated is subjected to a degassing and drying treatment whence air and a good deal of moisture are removed, the medium being generally under more or less high vacuum and the mixture being also subjected to the action of a countercurrent of superheated vapours. To the mixture to be treated there are added, preferably continuously, reagents and adsorbents, prior to entering the first section of the column, or it is merely heated, so that a partial drying takes place as well as distillation of the gaseous components which must be eliminated for the better success of subsequent treatments.

In this first section there is provided, in particular cases, the opportunity of condensation or of recovery of that portion of the mixture or of those components which are distilled in the subsequent stages of the process proper.

The internal structure of the first section comprises a rectifying column. The column may be provided with bubble trays, pipe-type or perforated tray type equipment therein, or packing, taking mainly into account the requirement of ensuring uniform distribution of the descending mixture and of the ascending vapours.

The central section of the activating column or second section provides the first of the two characteristic actions of the process according to the present invention, that is, the sudden thermal or radiating action more or less intensive according to the purpose of the process, upon conveniently distributed mixture.

This thermal action may be performed in various ways; for instance, by means of electric heaters or by means of heaters of other kind or by means of active circulation of said mixture under treatment through a convenient heater inside or outside the column. The thermal or radiating action may even be obtained by means of infrared radiation lamps or by means of generators of other radiations.

It is here that, mainly upon selected components of the mixture, there takes place the sudden thermal or radiation action mentioned, so as to operate chemical transformations proper or mere dehydration or other phenomena depending on the action of the reagents and of the other auxiliary materials that may have been previously added to the mixture.

In the cases in which there has been added to the mixture the solution of a reagent, this becomes concentrated until rendering said reagent sufficiently effective. Moreover, drying of the mixture is completed and, if held convenient, partial distillation of the more volatile components of said mixture is carried out.

In the case of purification and of decolorizing by adsorption, the sudden thermal or radiating action is such as to determine, or at least to enhance, the adsorptive action of the auxiliary materials previously added to the mixture for this purpose.

The second characteristic action of the process according to the present invention is carried out in the third section of the activating column, where there is provided the action upon the mixture, distributed over a pre-arranged wide surface, of gases or vapours, in general of steam, conveniently superheated, which passes through the column from bottom to top, that is, in countercurrent with respect to the liquid mixture.

The third section is of construction analogous to the first one, that is, by way of a rectifying column, generally of the packed column type.

Its function is to complete the effects attained in the preceding section as well as to add other effects of various kinds, having however always the same object of obtaining the consequent separation of determined components from the remainder of the mixture, by adsorption or by extraction by means of auxiliary materials.

As a particular case there may also be considered an oxidizing or reducing or other effect of chemical character attained either by means of the very gases or vapours passing through the column, or by means of suitable packing material prearranged for this purpose in said third section of the column.

On leaving the column, the mixture—having been previously cooled or not, as the case may be—passes to the conventional treatments of decanting, sedimentation, centrifuging or filtering in order to separate the purified fluid portion from the cake including the impurities, the extracted components or the respective products of reaction with the possible auxiliary materials that have served for the treatment.

Subsequent treatments on the separated materials may take place in the case in which it is desirable to recover particular valuable components such as vitamins and certain dyestuffs, retained or concentrated by adsorption on the material prearranged for this purpose such as activated carbon or decolorizing earths. In this case obviously the characteristic actions taking place in the activating column are adjusted in such a manner as not to cause any alterations in the chemical constitution of the products which are to be recovered.

The process and apparatus equipment according to the present invention will be made more fully clear by the description of one of the embodiments thereof, which is given merely by way of example, without any limitation thereto in respect of all the other forms of application falling as will be well understood within the scope of the present invention.

In the accompanying drawings, the figure represents diagrammatically the application of the instant process to the purification and to the simultaneous decolorizing by continuous method of a crude fat, including one with high free acidity content, such as for instance an oil obtained by extraction by means of solvents from the olive husk or from altered oleiferous seed or fruits, or an acid oil obtained from the pulps of refining of any vegetable or animal oil, so as to render it refinable for edible use on deacidifying by distillation.

The crude oil reaches the constant level head tank 1 by means of the feed pump 2. The valve 3 is provided to adjust the crude oil feed to which in the mixer 4 is continuously added a mixture comprising by decolorizing earth and activated carbon as contained in the hopper 5 and measured by the feeder 6. From the vessel 7, there is fed to the mixer 4 a reagent comprising for instance by a solution of zinc chloride, the amount of which is adjustable by means of the valve 8. The mixture of the crude oil with the adsorbents and the reagent passes continuously to the upper section 9 of the activating column 10 where it is distributed with uniformity over the prearranged packing material 11 by means of the pipe-type tray 12.

In this preparatory stage of the process the mixture is maintained in a medium at reduced pressure as obtained by means of the equipment group 13 for condensing vapour and for obtaining vacuum. Moreover, said mixture while descending through the packing material 11 meets the superheated vapours that pass through the column from bottom to top. In this first stage of treatment there takes place degassing as well as partial drying of said mixture.

So the mixture attains the central section 14 where it comes suddenly in contact with a plentiful hot flow of the same mixture as recycled by means of the centrifugal pump 15 through the high pressure vapour heater 16.

The mixture is thus subjected to an intensive and sudden heating to a temperature of from 140 to 220° C. as the case may be, whereby only extraneous substances (the substances other than the original fat substance) undergo such a complex of changes in their structure and chemical constitution as to render them more easily eliminated with the subsequent separating treatments. This results from the greater sensitivity of those foreign substances to the action provided, as compared with the original fat substance, which does not undergo any alteration. It is also by virtue of the rapidity of action, which is another advantage of the process according to the present invention, that there do not occur the feared phenomena of denaturation of the original fat substance, such as isomerizations, polymerizations and, sometimes, interchange of ester radicals.

Another advantage of the instant process is the very intensive degree of turbulence which the mixture under treatment comes to assume and which is due to the instantaneous evolving of vapours from the moisture still present as well as from the fatty acids of lower molecular weight which then are entirely recovered in the first section of the column or by means of the refluxing condenser 17.

The concentrating, which too is instantaneous, of the solution of the reagent, in this case zinc chloride, involves an intensive and well-distributed action upon the substances polluting the fatty substance. The reagent has—in this particular form of elevated concentration—also a considerable action of activation of the original adsorptive power of the decolorizing earth and of the activated carbon employed.

But the action of activation, adjustment and enhancing proper of the original specific adsorptive capacity of the auxiliary materials employed for this purpose, is exerted in the third section 18 of the column. The mixture distributed over the wide surface of the packing material 19 is subjected to a countercurrent of vapour coming from the vacuum vaporization cooler 20 and superheated in the heater 21 by high pressure steam.

Experimental tests have established indeed the enhanced decolorizing effect of activated carbons and decolorizing earths mixed with a crude fat running through a column under the conditions as set forth above.

To the action of superheated vapour upon the thin layer of mixture flowing over the packing material, there is added that of the chemical character of the very packing material. It has thus been found that a packing material made of aluminium increases the effect of the adsorbents in the decolorizing of crude fats, better than a material of same shape but made of ceramic stoneware ("grès").

From the activating column 10, the mixture passes to cooling down to a temperature of about 70° C. in the vacuum-vaporization apparatus 20 for condensation water. The valve 22 adjusts the feed of water of condensation which is also a generator of the activating vapour (steam) passing through the column.

Finally the mixture is extracted from the vacuum cooler 20 by means of the pump 23 and lifted to the tank 24 from which by means of the centrifugal pump 25 it is conveyed under pressure to the filter-press 26 for the definitive separation of the impurities and of the adsorbents.

The process according to the present invention as applied according to the flow-sheet of Fig. 1 to crude oils of fats, even much altered and having elevated free acidity, affords a degree of purification and decolorizing at least equal to that obtainable after de-acidifying with caustic soda lye. Thus de-acidifying by distillation and deodorizing become applicable in one single continuous operation, thereby obtaining—without any sensible losses of neutral fat—refined oil and distilled fatty acids of faultless quality.

I claim:

1. The method of purifying crude stocks, said stocks being selected from the group consisting of edible fats and oils, which comprises the steps of: subjecting a fluid mixture of the crude stock and a bleaching adsorbent to a sudden rise in temperature by bringing said mixture, while falling in subdivided state, into commingling contact with a separate hot mixture of said crude stock and a bleaching adsorbent, said separate hot mixture being heated to a temperature which is insufficient to cause polymerization of the fat content of the crude stock, the commingling being made at sub-atmospheric pressure and a temperature of about 140–220° C., allowing the commingled materials to continue to fall, and moving a rising stream of superheated steam in countercurrent contact with said falling commingled materials.

2. The method of claim 1 in which the bleaching adsorbent is decolorizing earth.

3. The method of claim 1 in which the bleaching adsorbent includes zinc chloride.

4. The method of claim 1 in which the oil is an olive oil.

5. The method of claim 1 in which the heated mixture is subjected to the action of superheated steam while flowing in a thin film over metallic aluminum packing.

References Cited in the file of this patent

UNITED STATES PATENTS

| | | |
|---|---|---|
| 1,114,095 | Baskerville | Oct. 20, 1914 |
| 2,500,934 | Rahway | Mar. 21, 1950 |
| 2,569,136 | Vogel | Sept. 25, 1951 |
| 2,618,644 | Bailey | Nov. 18, 1952 |
| 2,674,609 | Beal et al. | Apr. 6, 1954 |
| 2,717,256 | McMichael et al. | Sept. 6, 1955 |
| 2,743,915 | Miller et al. | May 1, 1956 |
| 2,781,301 | Payne | Feb. 12, 1957 |
| 2,804,427 | Suriano | Aug. 27, 1957 |
| 2,845,444 | Thomson | July 29, 1958 |

FOREIGN PATENTS

| | | |
|---|---|---|
| 307,750 | Great Britain | June 10, 1930 |

OTHER REFERENCES

Andersen: "Refining of Oils and Fats," Academic Press, Inc., New York, 1953, pages 154 to 159.